United States Patent
Yang et al.

(10) Patent No.: US 9,524,740 B2
(45) Date of Patent: Dec. 20, 2016

(54) WAVEGUIDE OF A WRITE HEAD WITH REDUCED CROSSTRACK WIDTH PROXIMATE A NEAR-FIELD TRANSDUCER

(71) Applicant: Seagate Technology LLC, Cupertino, CA (US)

(72) Inventors: Ruoxi Yang, St. Louis Park, MN (US); Werner Scholz, Camberwell (AU)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/886,249

(22) Filed: Oct. 19, 2015

(65) Prior Publication Data

US 2016/0118070 A1 Apr. 28, 2016

Related U.S. Application Data

(60) Provisional application No. 62/067,747, filed on Oct. 23, 2014.

(51) Int. Cl.

| G11B 11/00 | (2006.01) |
|---|---|
| G11B 5/48 | (2006.01) |
| G11B 5/187 | (2006.01) |
| G11B 5/00 | (2006.01) |
| G11B 11/105 | (2006.01) |

(52) U.S. Cl.
CPC ........... *G11B 5/4866* (2013.01); *G11B 5/1871* (2013.01); *G11B 11/10532* (2013.01); *G11B 11/10543* (2013.01); *G11B 11/10554* (2013.01); *G11B 2005/0021* (2013.01)

(58) Field of Classification Search
None
See application file for complete search history.

(56) References Cited

U.S. PATENT DOCUMENTS

| 8,270,791 | B2* | 9/2012 | Komura | B82Y 20/00 |
|---|---|---|---|---|
| | | | | 369/44.12 |
| 8,509,037 | B1 | 8/2013 | Huang et al. | |
| 8,619,514 | B1* | 12/2013 | Matsumoto | G11B 5/314 |
| | | | | 369/13.33 |
| 9,147,415 | B2 | 9/2015 | Clinton et al. | |
| 2007/0110379 | A1 | 5/2007 | West et al. | |
| 2007/0230288 | A1* | 10/2007 | Nishida | B82Y 10/00 |
| | | | | 369/13.13 |
| 2007/0242921 | A1* | 10/2007 | Matsumoto | B82Y 20/00 |
| | | | | 385/33 |
| 2011/0019510 | A1* | 1/2011 | Nishida | B82Y 10/00 |
| | | | | 369/13.12 |
| 2011/0216635 | A1* | 9/2011 | Matsumoto | G11B 5/105 |
| | | | | 369/13.33 |
| 2012/0039155 | A1 | 2/2012 | Peng et al. | |
| 2012/0182842 | A1* | 7/2012 | Iwanabe | G11B 5/314 |
| | | | | 369/13.17 |

(Continued)

*Primary Examiner* — Tan X Dinh
(74) *Attorney, Agent, or Firm* — Hollingsworth Davis, LLC (57) ABSTRACT

A write head includes a near-field transducer near a media-facing surface of the write head and a waveguide. The waveguide includes a core that overlaps or is co-planer with the near-field transducer at a first region. The core has a second region extending away from the near-field transducer to an energy source. The core has a third region between the first and second regions. The third region has a third crosstrack width that is less than first and second crosstrack widths of the first and second regions.

20 Claims, 5 Drawing Sheets

(56) References Cited

U.S. PATENT DOCUMENTS

| | | | | |
|---|---|---|---|---|
| 2012/0327751 | A1* | 12/2012 | Iwanabe | G11B 5/314 |
| | | | | 369/13.02 |
| 2013/0142020 | A1* | 6/2013 | Rawat | G11B 5/314 |
| | | | | 369/13.33 |
| 2013/0223806 | A1 | 8/2013 | Itagi | |
| 2015/0302874 | A1* | 10/2015 | Asselin | G11B 5/6088 |
| | | | | 369/13.33 |

* cited by examiner

| Configuration | Peg Temp. | Media Temp. | Media-Head Temp. Ratio | Reflection |
|---|---|---|---|---|
| Baseline | - | - | - | 1 |
| Tapered | -1.3% | +6.9% | +1.3% | -14% |
| Squeezed | -0.1% | -1.9% | +0.1% | -26% |
| Squeezed and Tapered | -1.1% | +5% | +1.1% | -41% |

*FIG. 7*

| Configuration | Scaled Thermal Gradient | Crosstrack Erasure |
|---|---|---|
| Baseline | 1 | 1 |
| Tapered | +3.5% | approx -1% |
| Squeezed and Tapered | +3.5% | approx -1% |

WAVEGUIDE OF A WRITE HEAD WITH REDUCED CROSSTRACK WIDTH PROXIMATE A NEAR-FIELD TRANSDUCER

RELATED PATENT DOCUMENTS

This application claims the benefit of Provisional Patent Application Ser. No. 62/067,747 filed on Oct. 23, 2014, to which priority is claimed pursuant to 35 U.S.C. §119(e), and which is incorporated herein by reference in its entirety.

SUMMARY

The present disclosure is related to a waveguide of a write head with a reduced crosstrack width proximate to a near-field transducer. In one embodiment, a write head includes a near-field transducer near a media-facing surface of the write head and a waveguide. The waveguide includes a core that overlaps or is co-planer with the near-field transducer at a first region. The core has a second region extending away from the near-field transducer to an energy source. The core has a third region between the first and second regions. The third region has a third crosstrack width that is less than first and second crosstrack widths of the first and second regions.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

The present disclosure is generally related to an apparatus (e.g., a HAMR write head) having a waveguide that delivers light from an energy source (e.g., laser diode) to a near-field transducer (NFT). The NFT may also be referred to as a plasmonic transducer, plasmonic antenna, near-field antenna, nano-disk, nan-patch, nano-rod, etc. The light generates a surface plasmon field on the NFT, and the surface plasmons are directed out of a surface of the write head onto a magnetic recording medium. This creates a hotspot on the recording medium, lowering its magnetic coercivity and enabling a local magnetic field generated by a write pole to write data to the hotspot.

While the waveguide is designed to couple light from the energy source to the NFT as efficiently as possible, there will be some losses. One source of loss is stray light that propagates through the body of the write head. The stray light may sometimes reflect back to the energy source, other times reflect out of the media-facing surface of the write head. The former situation may lead to unwanted modulation of the energy source, and the latter may lead to unwanted erasure of the recording medium. Other effects that may be caused by stray light include unwanted heating of regions of the write head.

In embodiments described below, a write head includes waveguide features that are designed to reduce stray light near a coupling region of the waveguide and NFT. This involves, among other things, tailoring a shape of the waveguide core prior to the NFT to have regions of reduced cross-section. It should be noted that this reduced cross-section can be used for HAMR without significant drawback because light delivery requirement for HAMR is not necessarily to maintain large, far-field power at the media-facing surface, but to generate a large localized field near the NFT. The waveguide core may also be tapered past the NFT. This can help redistribute the energy and enhance NFT efficiency.

Figure 1:
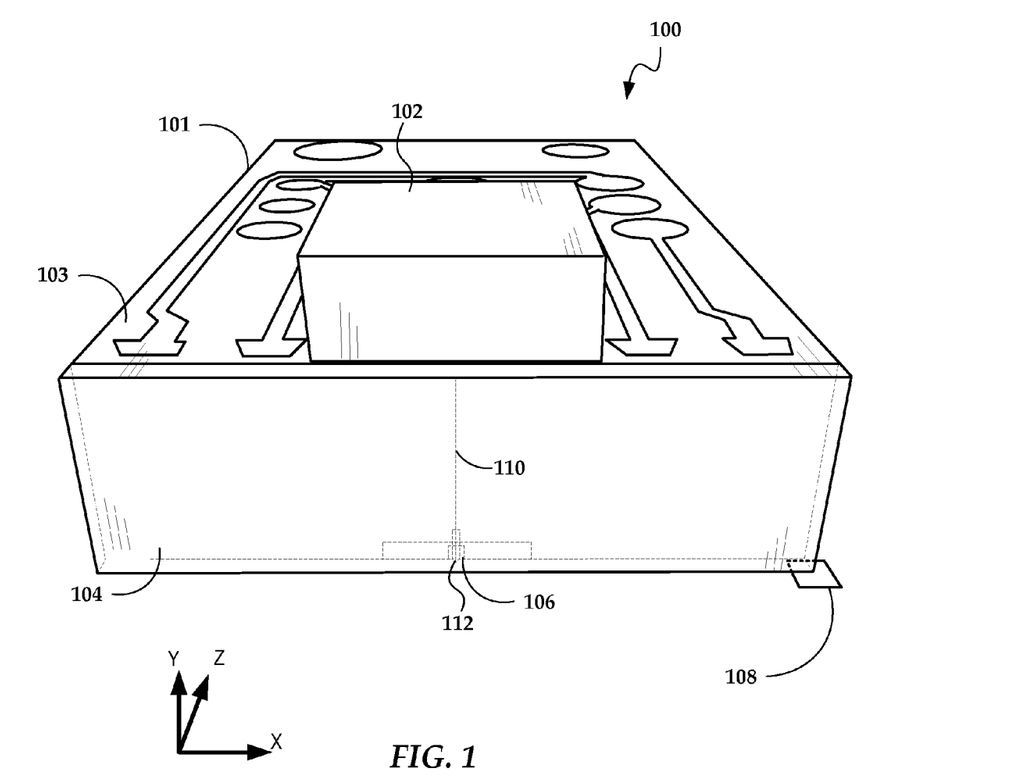
FIG. 1 is a perspective view of a slider assembly according to an example embodiment.

In reference to FIG. 1, a perspective view shows a HAMR write head 100 according to an example embodiment. The write head 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write transducer 106, which is located near the media-facing surface 108. The energy is used to heat the recording media as it passes by the read/write transducer 106. Optical coupling components, such as a waveguide system 110, are formed integrally within the slider body 101 (near a trailing edge surface 104 in this example) and function as an optical path that delivers energy from the laser diode 102 to the recording media via a near-field transducer 112. The near-field transducer 112 is located near the read/write transducer 106 and causes heating of the media during recording operations. The near-field transducer 112 may be made from plasmonic materials such as gold, silver, copper, etc.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface.

While the example in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the write head 100, and coupled to the slider by way of optic fiber and/or waveguide. An input surface of the slider body 101 may include a grating or other coupling feature to receive light from the laser via the optic fiber and/or waveguide.

Figure 2:
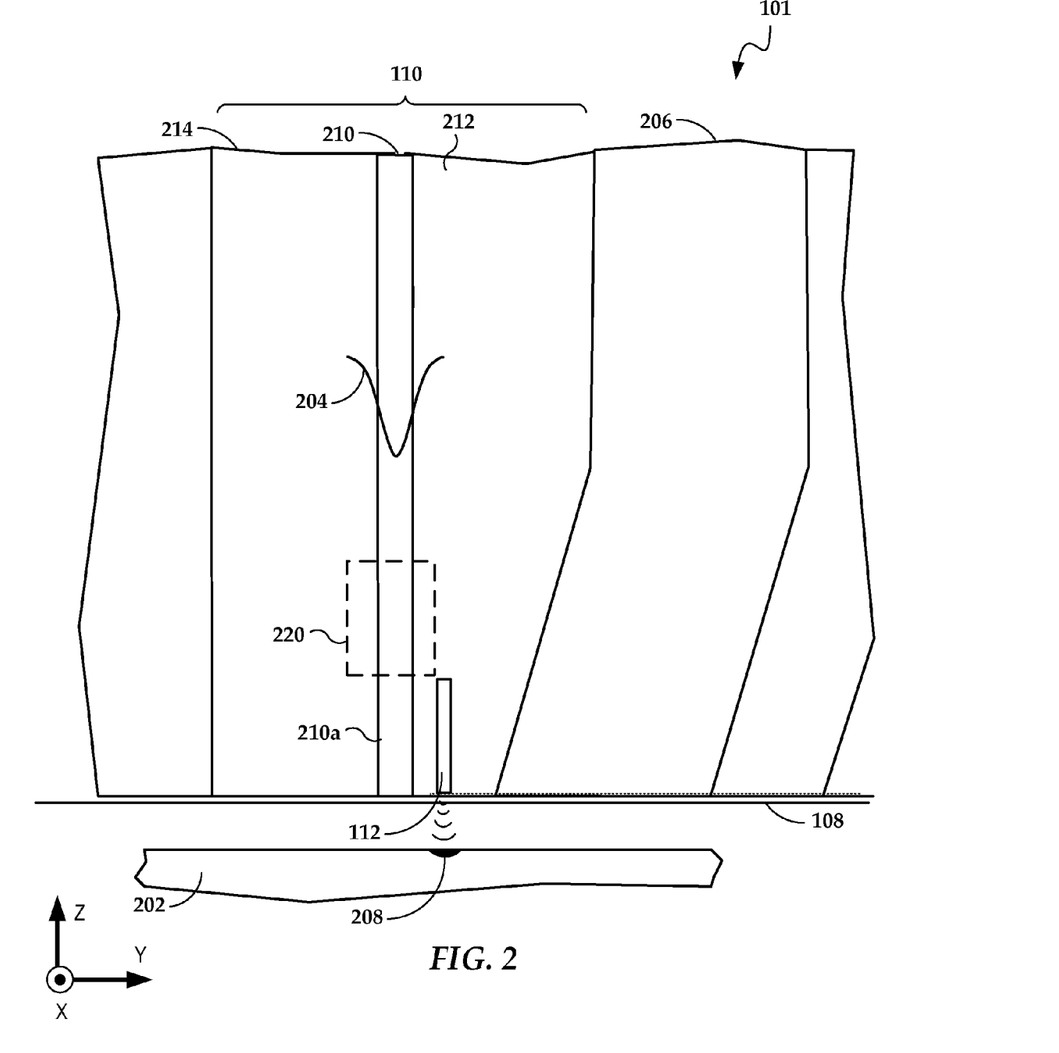
FIG. 2 is a cross-sectional view illustrating details of a light path according to an example embodiment.

In FIG. 2, a cross-sectional view illustrates portions of the slider body 101 near the near-field transducer 112 according to an example embodiment. In this view, the near-field transducer 112 is shown proximate to a surface of magnetic recording medium 202, e.g., a magnetic disk. The waveguide system 110 delivers electromagnetic energy 204 to the near-field transducer 112, which directs the energy 204 to create a small hotspot 208 on the recording medium 202. A magnetic write pole 206 causes changes in magnetic flux near the media-facing surface 108 in response to an applied current. Flux from the write pole 206 changes a magnetic orientation of the hotspot 208 as it moves past the write pole 206 in the downtrack direction (y-direction).

The waveguide system 110 includes a core layer 210 surrounded by cladding layers 212, 214. The core layer 210 and cladding layers 212, 214 may be made from dielectric materials such as $Al_2O_3$, SiOxNy, $SiO_2$, $Ta_2O_5$, $TiO_2$, ZnS, SiNx, $Nb_2O_5$, AlN, $Hf_2O_3$, $Y_2O_3$, etc. Generally, the dielectric materials are selected so that the refractive index of the core layer 210 is higher than refractive indices of the cladding layers 212, 214. This arrangement of materials facilitates efficient propagation of light through the waveguide system 110.

A first end of the core 210 (not shown) extends along the light propagation direction (z-direction) where it is directly or indirectly coupled to a light/energy source. For example, a laser diode may have an output facet that is coupled face-to-face with an end of the waveguide core 210. In other configurations, optical components such as lenses, mirrors, collimators, mode converters, etc., may be coupled between the waveguide core 210 and the light/energy source. In either case, the energy coupled into the first end of the waveguide core 210 propagates to a second end 210a that is proximate the near-field transducer.

As indicated by region 220, the core layer 210 includes a change in shape between the near-field transducer 112 and the first end of the core 210. The region 220 at least includes a reduction in a crosstrack width of the core 210. This change in shape can cause an artificial mismatch of waveguide mode and better profile match with the near-field transducer 112, and can boost coupling efficiency and thermal gradient of the hotspot 208. In some embodiments this results in lowered media-to-head (MH) temperature ratio because of reduced background heating (resulting in lower media temperature) and/or increased light utilization by the near-field transducer 112 (resulting higher write head temperature)

Figure 3:
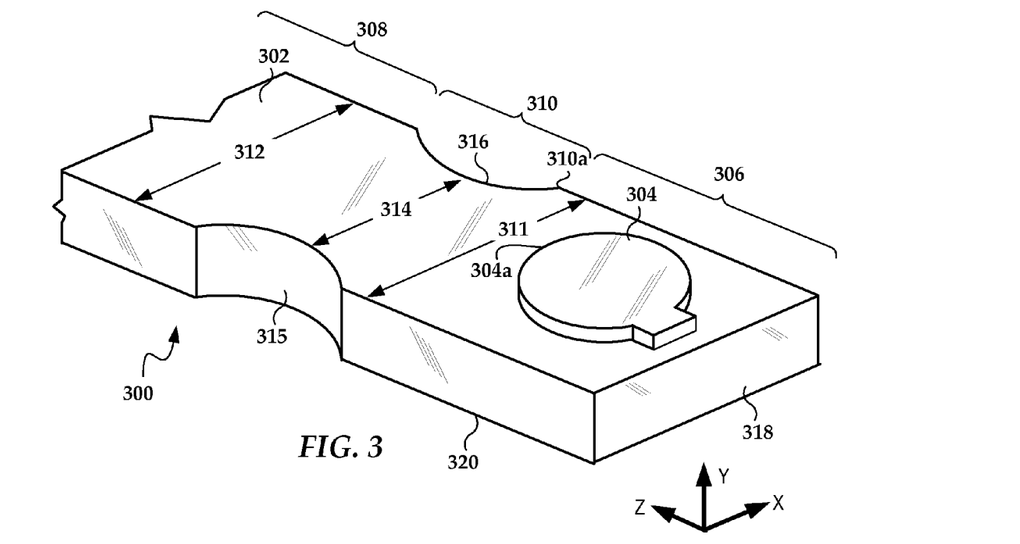
FIGS. 3 and 4 are perspective views of waveguide cores according to example embodiments.

In FIG. 3, a perspective view shows an example of an end of a multimode channel waveguide core 300 according to an example embodiment. In this view, the xz-plane is a substrate parallel plane, the x-direction is crosstrack, the y-direction is downtrack, and light propagates along the z-direction. The core 300 has a first side 302 disposed proximate to a near-field transducer 304. The core 300 overlaps or is co-planar with the near-field transducer 304 at a first region 306, also referred to herein as an end portion or second end of the core 300. The core 300 has a second region 308 extending away from the near-field transducer 304 to an energy source, e.g., a laser diode.

A third region 310 of the core 300 is between the first and second regions 306, 308. The first and second regions 308, 306 have first and second crosstrack widths 311 and 312. The third region 310 has a second crosstrack width 314 that is less than the first and second crosstrack widths 311, 312. The third region 310 may be fairly close to the near-field transducer 304, e.g., a media-facing end 310a of the third region 310 less than 200 nm (e.g., approximately one quarter wavelength of the light) from a light-source facing end 304a of the near-field transducer 304 (the distance measured along the z-axis). In some cases, an edge of the near-field transducer 304 may overlap the third region 310 slightly (see, e.g., FIGS. 5 and 6).

In the illustrated example, first and second crosstrack widths 311, 312 are substantially equal (e.g., within manufacturing tolerances), but in other embodiments may be different from each other. The third region 310 in this example has curved edges 315, 316 that result in the reduced crosstrack width 314. Other shapes may be used to create this reduced width, such as polylines. Generally, the shape of the third region results in local mode shaping proximate the near-field transducer 304, and/or reduces reflections back to the energy source. The surface plasmons generated at the near-field transducer 304 are directed out a media-facing surface 318, e.g., an air bearing surface of the write head.

While not shown, a first cladding layer encompasses a second side 320 of the core 300. A second cladding layer may be overlaid on the first side 302 of the core 300. One or both of these cladding layers may also cover edges of the core 300, e.g., edges 315, 316. In other embodiments, a side cladding layer may cover just the edges of the core 300, and may be made from a material that is different than one or both of the first and second cladding layers.

In this example, the near-field transducer 304 is shown as a circular disk with a peg extending towards the media-facing surface 318. Other near-field transducers shapes may be used with the illustrated waveguide core 300 (as well as other embodiments shown below), including one or more rectangular plates with or without a peg, an elongated "capsule" shaped plate with a protruding peg, and elongated peg without any plates, etc. Similarly, the relative sizes of core features, such as location and length of third region 410, height, width of the core 300, etc., may vary from what is shown.

Figure 4:
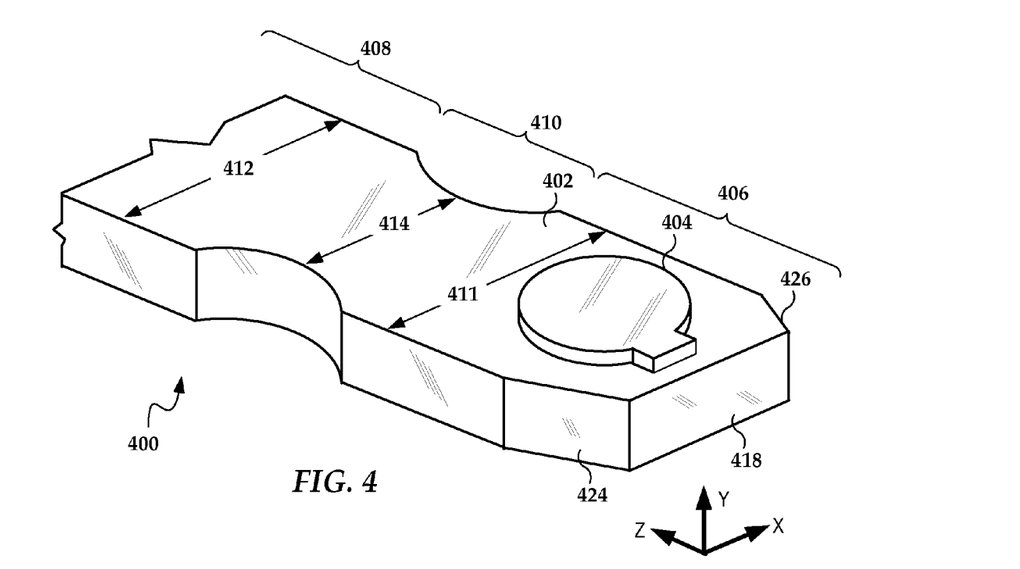

In FIG. 4, a perspective view shows an example of an end of a multimode channel waveguide core 400 according to another example embodiment. Some aspects of the core 400 are similar to core 300 in FIG. 3, and reference is made to the discussion of FIG. 3 for any additional structures and alternative configurations not disclosed below in the description of FIG. 4. The core 400 has a first side 402 disposed proximate to a near-field transducer 404. The core 400 overlaps or is co-planar with the near-field transducer 404 at a first region 406. The core 400 has a second region 408 extending away from the near-field transducer 404 to an energy source, e.g., a laser diode.

A third region 410 of the core 400 is between the first and second regions 406, 408. The first and second regions 408, 406 have first and second crosstrack widths 411 and 412. The third region 410 has a second crosstrack width 414 that is less than the first and second crosstrack widths 411, 412. The first region has a taper, formed by edges 424, 426, that reduces a crosstrack width of the core 400 near a media facing surface 418.

Figure 5:
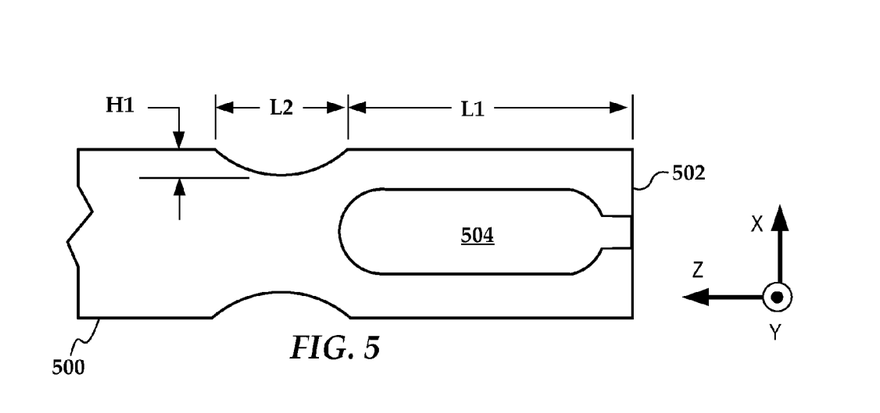
FIGS. 5 and 6 are plan views of waveguide cores according to example embodiments.
Figure 6:
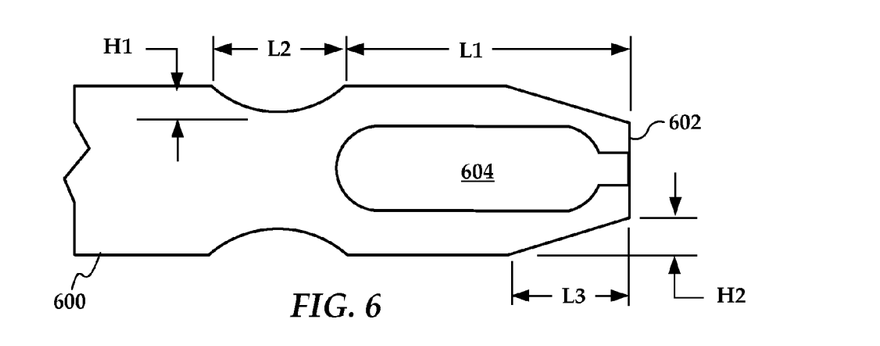
Figure 7:
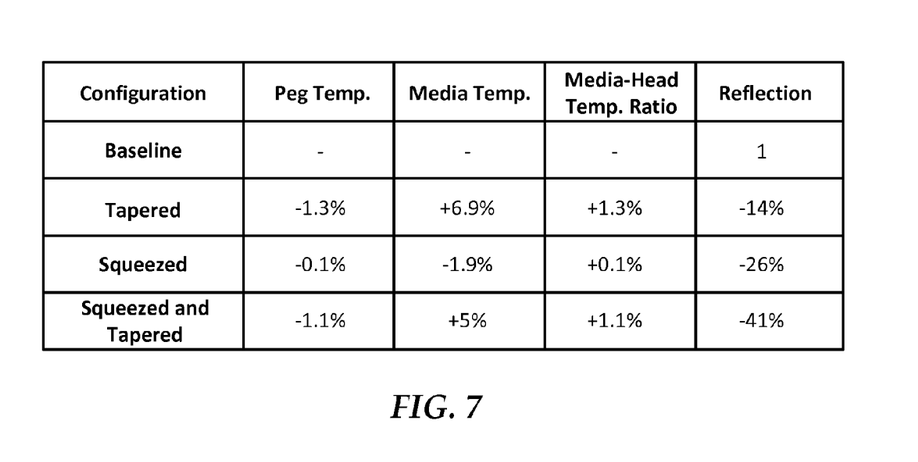
FIGS. 7 and 8 are tables showing analysis results for waveguide configurations according to example embodiments.

In FIGS. 5 and 6, plan views of multimode, channel waveguide cores 500, 600 show particular dimensions used in an analysis of performance. The waveguides are coupled to respective NFTs 504, 604 that are configured as extended rectangles with round edges (e.g., capsule-shaped) having a peg extending towards respective media-facing surfaces 502, 602. For the analysis of both configurations, L1=800 nm, L2=300 nm, and H1=300 nm for the "squeezed" portion. Thus a length of the squeezed portion in the light propagation direction (z-direction) is less than a length of the region where the NFTs 504, 604 are located. For the tapered configurations analyzed (both with and without the squeezed portion), L3=500 nm and H2=200 nm. Results are summarized in the table of FIG. 7.

Figure 8:
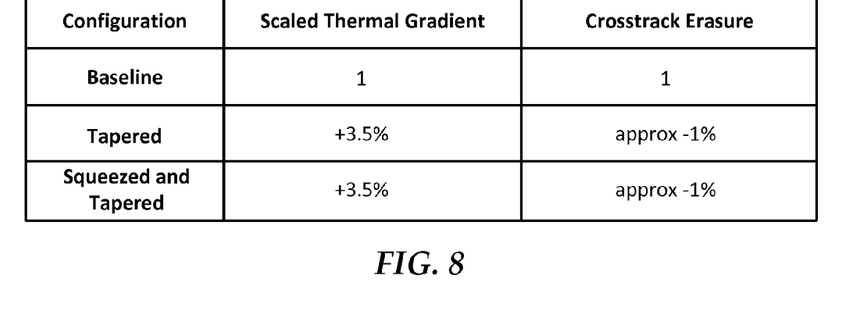

This analysis predicts that the squeezed waveguide mid-section, when combined with waveguide tapering near the media-facing surface, has the best performance for feedback reduction. Using a narrower waveguide section between the NFT and energy source can reduce feedback by about 40% with no additional lithography layer or metal added. There is no significant penalty in light delivery, and it is expected that media heating efficiency can be enhanced by about 5%. The mismatch caused by the narrowed section can be understood as both an additional reflector that cancels the reflections from the media-facing surface, and a mode shaping region for better NFT excitation. Results of a thermal gradient and crosstrack erasure analysis are shown in the table of FIG. 8. This shows that the use of the squeezed mid-section does not substantially change the profile of the emitted light at the media-facing surface.

Figure 9:
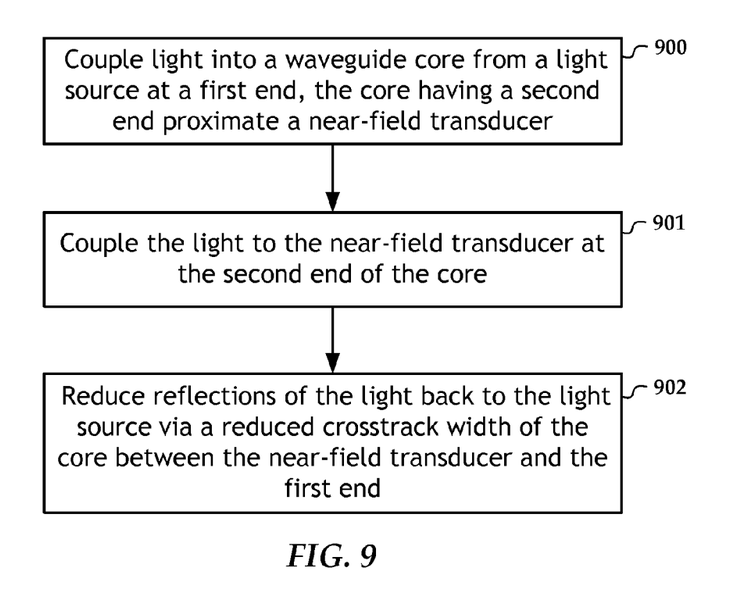
FIG. 9 is a flowchart illustrating a method according to an example embodiment.

In FIG. 9, a flowchart illustrates a method according to an example embodiment. The method involves coupling 900 light into a waveguide core from a light source at a first end, the core having a second end proximate a near-field transducer. The light is coupled 901 to the near-field transducer at the second end. Reflections of the light back to the light source are reduced 902 via a reduced crosstrack width of the core between the near-field transducer and the first end.

In one embodiment, the reduced crosstrack width may be achieved by curved edges of the core. In another embodiment, the reflections of the light are further reduced by a taper that reduces a crosstrack width of the core near a media facing surface. The reduced crosstrack width and/or taper may also result in local mode shaping proximate the near-field transducer. A light-source-facing end of the near-field transducer may be proximate the reduced crosstrack width, e.g., aligned with or within 200 nm or about one quarter wavelength of the applied light.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A write head, comprising:
    a near-field transducer near a media-facing surface of the write head; and
    a waveguide comprising a core that overlaps or is co-planer with the near-field transducer at a first region, the core having a second region extending away from the near-field transducer to an energy source, and a third region between the first and second regions, the first and second regions having first and second crosstrack widths and the third region having a third crosstrack width that is less than the first and second crosstrack widths.

2. The write head of claim 1, wherein the first region comprises a taper that reduces a crosstrack width of the core near a media facing surface.

3. The write head of claim 2, wherein the third region comprises curved edges.

4. The write head of claim 1, wherein the third region comprises curved edges.

5. The write head of claim 1, wherein the third region reduces reflections back to the energy source.

6. The write head of claim 1, wherein the third region results in local mode shaping proximate the near-field transducer.

7. The write head of claim 1, wherein the first and second crosstrack widths are substantially equal.

8. The write head of claim 1, wherein the waveguide comprises a multimode channel waveguide.

9. The write head of claim 1; wherein a media-facing end of the third region is less than 100 nm from a light-source facing end of the near-field transducer.

10. The write head of claim 1; wherein a light-source facing end of the near-field transducer overlaps a media-facing end of the third region.

11. The write head of claim 1, wherein the second region is longer along a light propagation direction than the third region.

12. A write head, comprising:
    a near-field transducer near a media-facing surface of the write head; and
    a waveguide comprising a waveguide core that receives light from a light source at a first end and has a second end proximate the near-field transducer, the waveguide core having a region of reduced crosstrack width between the near-field transducer and the first end that reduces reflections of the light back to the light source.

13. The write head of claim 12, wherein the second end comprises a taper that reduces a second crosstrack width of the waveguide core near a media facing surface.

14. The write head of claim 12, wherein the reduced crosstrack width results in local mode shaping proximate the near-field transducer.

15. The write head of claim 12, wherein the waveguide comprises a multimode channel waveguide.

16. The write head of claim 12, wherein a light-source facing end of the near-field transducer is proximate the reduced crosstrack width.

17. A method comprising:
    coupling light into a waveguide core from a light source at a first end of the waveguide core, the waveguide core having a second end proximate a near-field transducer;
    coupling the light to the near-field transducer at the second end; and
    reducing reflections of the light back to the light source via a region of reduced crosstrack width of the waveguide core between the near-field transducer and the first end.

18. The method of claim 17, further comprising further reducing reflections of the light back to the light source via a taper at the second end of the waveguide core that has a second reduced crosstrack width near a media facing surface.

19. The method of claim 17, further comprising locally mode shaping the light coupled to the near-field transducer via the reduced crosstrack width.

20. The method of claim 17, wherein a light-source facing end of the near-field transducer is proximate the region of the reduced crosstrack width.

\* \* \* \* \*